US012615521B2

(12) United States Patent
Jiang et al.

(10) Patent No.: US 12,615,521 B2
(45) Date of Patent: Apr. 28, 2026

(54) METHOD AND DEVICE IN A NODE USED FOR WIRELESS COMMUNICATION

(71) Applicant: APOGEE NETWORKS, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 373 days.

(21) Appl. No.: 18/218,000

(22) Filed: Jul. 3, 2023

(65) Prior Publication Data

US 2023/0362667 A1       Nov. 9, 2023

Related U.S. Application Data

(63) Continuation of application No. PCT/CN2022/070707, filed on Jan. 7, 2022.

(30) Foreign Application Priority Data

Jan. 8, 2021     (CN) .......................... 202110022944.9

(51) Int. Cl.
H04W 16/28          (2009.01)
H04L 5/00           (2006.01)

(52) U.S. Cl.
CPC ........... H04W 16/28 (2013.01); H04L 5/0051 (2013.01)

(58) Field of Classification Search
CPC ... H04W 16/28; H04W 72/044; H04W 72/20; H04L 5/0051; H04L 5/0023; H04L 5/0048; H04L 5/0094; H04B 7/024
See application file for complete search history.

(56) References Cited

U.S. PATENT DOCUMENTS

| | | |
|---|---|---|
| 11,051,254 B2 | 6/2021 | Liu et al. |
| 2021/0051643 A1 | 2/2021 | Jiang et al. |

FOREIGN PATENT DOCUMENTS

| | | |
|---|---|---|
| CN | 111866790 A | 10/2020 |
| WO | 2018171494 A1 | 9/2018 |
| WO | 2020033088 A1 | 2/2020 |
| WO | 2020057362 A1 | 3/2020 |

OTHER PUBLICATIONS

ISR received in application No. PCT/CN2022/070707 dated May 18, 2022.

(Continued)

*Primary Examiner* — Eric Myers
(74) *Attorney, Agent, or Firm* — Volpe Koenig

(57)          ABSTRACT

The present disclosure provides a method and a device in a node for wireless communications. A node firstly receives a first signaling in a first link; and operates a first signal in a first link and transmits a second signal in a second link; the first signaling is used to determine a first identifier, the first identifier being used to indicate a first reference signal resource; the first reference signal resource is used to determine a spatial filter for a DMRS for a channel occupied by the first signal; the first identifier is used to determine a second identifier set; the second identifier set comprises a second identifier, the second identifier being used to indicate a second reference signal resource. The present disclosure improves the method and device for sidelink TCI design to optimize the system performance.

20 Claims, 5 Drawing Sheets

(56) References Cited

OTHER PUBLICATIONS

Third Generation Partnership Project, "Technical Specification Group Radio Access Network; NR; Physical channels and modulation (Release 16)," 3GPP TS 38.211 V16.3.0 (Sep. 2020).

Third Generation Partnership Project, "Technical Specification Group Radio Access Network; NR; Multiplexing and channel coding (Release 16)," 3GPP TS 38.212 V16.3.0 (Sep. 2020).

Third Generation Partnership Project, "Technical Specification Group Radio Access Network; NR; Physical layer procedures for control (Release 16)," 3GPP TS 38.213 V16.3.0 (Sep. 2020).

Third Generation Partnership Project, "Technical Specification Group Radio Access Network; NR; Physical layer procedures for data (Release 16)," 3GPP TS 38.214 V16.3.0 (Sep. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

| Second node N5 | First node U4 | Third node U6 |
|---|---|---|
| S50.transmitting first information set | | |

——first information set——▶

| | S40.receiving first information set | |

| S51.transmitting target information set | | |

——target information set——▶

| | S41.receiving target information set | |

| S52.transmitting first signaling in first link | | |

————first signaling————▶

| | S42.receiving first signaling in first link | |

| S53.transmitting first signal in first link | | |

————first signal————▶

| | S43.receiving first signal in first link | |

| | S44.transmitting second signaling in second link | |

————second signaling————▶

| | | S60.receiving second signaling in second link |

| | S45.transmitting second signal in second link | |

————second signal————▶

| | | S61.receiving second signal in second link |

( End )      ( End )      ( End )

FIG. 6

First node

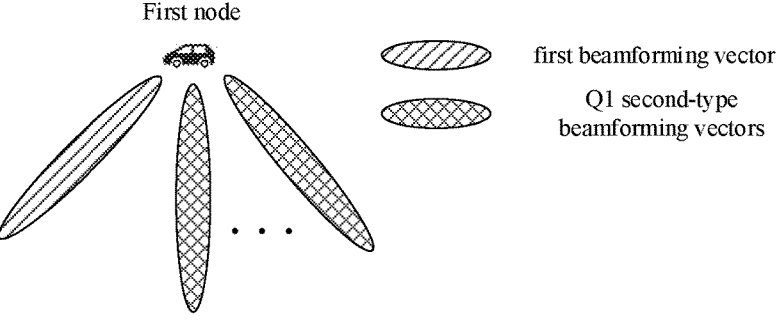

first beamforming vector

Q1 second-type beamforming vectors

FIG. 7

| first-type identifier #0 | — | second-type identifier #0 |

⋮                ⋮

| First-type identifier #(Q1-1) | — | second-type identifier #(Q1-1) |

Frequency domain first time-frequency resource set second time-frequency resource set Time domain

| First identifier | | Second-type identifier #0 |

| | | Second-type identifier #1 |

⋮

| | | Second-type identifier #(Q1-1) |

Second node second link

First node    ←—first link—→    Third node

METHOD AND DEVICE IN A NODE USED FOR WIRELESS COMMUNICATION

CROSS-REFERENCE TO RELATED APPLICATION

This application is a continuation of International Application No. PCT/CN2022/070707, filed Jan. 7, 2022, claims the priority benefit of International Application No. 202110022944.9, filed on Jan. 8, 2021, the full disclosure of which is incorporated herein by reference.

BACKGROUND

Technical Field

The present disclosure relates to transmission methods and devices in wireless communication systems, and in particular to a design scheme and device for beamforming-based transmission in sidelink in wireless communications.

Related Art

In 5G New Radio (NR), Massive Multi-Input Multi-Output (MIMO) is a key technology. In Massive MIMO, multiple antennas form through beamforming a narrow beam pointing in a specific direction to enhance communication quality. In 5G NR, a base station configures a control signaling and beam transmission properties of a data channel through Transmission Configuration Indication (TCI). For the control signaling, the base station can indicate a TCI State employed when blind detecting a corresponding Control Resource Set (CORESET) through Medium Access Control (MAC) Control Elements (CE); as for the data channel, the base station can activate a plurality of TCI-States through the MAC CE, and, through Downlink Control Information (DCI), dynamically indicates that one of the TCI-States is applied in transmission of a Physical Downlink Shared Channel (PDSCH), thus adjusting a receive (Rx) beam in a dynamic manner.

In contrast to the Uu interface between the base station and the terminal, in which a TCI is introduced for the purpose of achieving beamforming-based transmission, the Vehicle-to-Everything (V2X) in Release 16 does not include the transmission based on beamforming. In Release 17 of the future and follow-up releases, beamforming will be introduced in V2X, along with proposals of solutions to concerned issues.

SUMMARY

Inventors have found through researches that in the current V2X transmissions, transmitting in V2X is always performed by the principle of power control to some extent for the purpose of ensuring no influence incurred by the V2X transmitting upon the uplink of a Uu interface. But when bringing beamforming into V2X, interferences among different beams are expected to get very low, and how V2X link transmission based on beamforming will interfere with the Uu interface shall be studied in a new perspective.

To address the above problem, the present disclosure provides a solution. It should be noted that though the present disclosure only took the massive MIMO and beam-based communications as a typical or exemplary scenario in the statement above, it is also applicable to other scenarios such as LTE multi-antenna system, where similar technical effects can be achieved. Additionally, the adoption of a unified solution for various scenarios, including but not limited to massive MIMO, beam-based communications, and LTE multi-antenna system, contributes to the reduction of hardcore complexity and costs. In the case of no conflict, the embodiments of any node and the characteristics in the embodiments may be applied to any other node, and vice versa. What's more, the embodiments in the present disclosure and the characteristics in the embodiments can be arbitrarily combined if there is no conflict.

In view of the above issue, the present disclosure discloses a method and device for beamforming-based transmission in sidelink. It should be noted that if no conflict is incurred, embodiments in a User Equipment (UE) in the present disclosure and the characteristics of the embodiments are also applicable to a base station, and vice versa. What's more, the embodiments in the present disclosure and the characteristics in the embodiments can be arbitrarily combined if there is no conflict. Further, though originally targeted at cellular networks, the present disclosure also applies to the Internet of Things (IoT) and Vehicle-to-Everything (V2X). Further, though originally targeted at multicarrier communications, the present disclosure also applies to single-carrier communications. Further, though originally targeted at multi-antenna communications, the present disclosure also applies to single-antenna communications. Further, the present disclosure is designed targeting terminal-base station scenario, but can be extended to inter-terminal communications, terminal-relay communications, Non-Terrestrial Networks (NTN) as well as relay-base station communications, where similar technical effects can be achieved. Additionally, the adoption of a unified solution for various scenarios, including but not limited to terminal-base station communications, contributes to the reduction of hardcore complexity and costs.

Furthermore, if no conflict is incurred, embodiments in the first node in the present disclosure and the characteristics of the embodiments are also applicable to a second node, and vice versa. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:

receiving a first signaling in a first link; and operating a first signal in a first link and transmitting a second signal in a second link;

herein, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and a receiver for the second signal are Non-Co-located.

In one embodiment, a technical feature of the above method lies in that: When the base station indicates to the first node through the first identifier which beam is to be employed in a first link, the first identifier also indicates a beam employed by the first node in the second link, that is, the second identifier set; namely, a beam used for the first link and a beam used for the second link can be determined at the same time according to the first identifier.

In one embodiment, another technical feature of the above method lies in that: by associating the first identifier with the second identifier set, it can be further guaranteed that no interference will occur between the beam in cellular link which adopts the first identifier and the beam in sidelink which adopts the second identifier set, thus enhancing the transmission performance.

According to one aspect of the present disclosure, comprising:

transmitting a second signaling in the second link;

herein, the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1.

According to one aspect of the present disclosure, comprising:

receiving a target information set;

herein, the target information set is used to indicate that the first identifier is associated with the second identifier set.

In one embodiment, the above method is characterized in that: through the target information set the first identifier and the second identifier set are explicitly configured to be associated, thus increasing the flexibility of configuration.

According to one aspect of the present disclosure, comprising:

receiving a first information set;

herein, the first information set is used to indicate a first identifier set, the first identifier set comprising K1 first-type identifiers; K1 is a positive integer greater than 1; the first identifier is a first-type identifier among the K1 first-type identifiers; the first signaling is used to indicate the first identifier from the K1 first-type identifiers.

According to one aspect of the present disclosure, the phrase that the first identifier is associated with the second identifier set means: the second identifier set comprises Q1 second-type identifiers, the Q1 second-type identifiers being respectively used to indicate Q1 second-type reference signal resources, the first reference signal resource is not spatially related with any of the Q1 second-type reference signal resources.

In one embodiment, the above method is characterized in that: it can be guaranteed that the first reference signal resource and the Q1 second-type reference signal resources are not mutually interfered spatially.

According to one aspect of the present disclosure, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

According to one aspect of the present disclosure, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

According to one aspect of the present disclosure, the operating is transmitting, time-domain resources occupied by the first signal and time-domain resources occupied by the second signal are overlapping.

In one embodiment, the above method is characterized in that: ensuring that sidelink transmission and cellular transmission are not interfering each other, the first node can transmit the first signal and the second signal simultaneously to improve the spectrum efficiency.

According to one aspect of the present disclosure, the first identifier is used to activate the second identifier set in the second link.

According to one aspect of the present disclosure, K1 is equal to Q1, the K1 first-type identifiers are respectively associated with the Q1 second-type identifiers, a position of the first identifier among the K1 first-type identifiers being the same as that of the second identifier among the Q1 second-type identifiers.

In one embodiment, the above method is characterized in that: the same TCI mapping relation is designed for both the sidelink and the cellular link, thus the signaling overhead is cut down and the system design is streamlined.

According to one aspect of the present disclosure, the first node autonomously determines the second identifier out of the second identifier set.

According to one aspect of the present disclosure, a pathloss from a transmitter for the first signaling to the first node is a first pathloss, the operating refers to transmitting, a transmit power value of the first signal is related to the first pathloss, and a transmit power value of the second signal is unrelated to the first pathloss.

In one embodiment, the above method is characterized in that: when the first signal and the second signal are not spatially related, a transmit power value of the second signal won't be affected by the pathloss in cellular link, which in turn ensures the transmission performance in the sidelink.

The present disclosure provides a method in a second node for wireless communications, comprising:

transmitting a first signaling in a first link; and executing a first signal in a first link;

herein, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a receiver for the first signaling includes a first node, the first node transmitting a second signal in a second link, a DMRS for a channel occupied by the second signal and the second reference signal resource are QCL; the first link is used for cellular communications, while the second link is used for communications other than cellular communications; the executing is transmitting, or the executing is receiving; a receiver for the first signal and a receiver for the second signal are Non-Co-located.

According to one aspect of the present disclosure, the first node transmits a second signaling in the second link; the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1.

According to one aspect of the present disclosure, comprising:

transmitting a target information set;

herein, the target information set is used to indicate that the first identifier is associated with the second identifier set.

According to one aspect of the present disclosure, comprising:

transmitting a first information set;

herein, the first information set is used to indicate a first identifier set, the first identifier set comprising K1 first-type identifiers; K1 is a positive integer greater than 1; the first identifier is a first-type identifier among the K1 first-type identifiers; the first signaling is used to indicate the first identifier from the K1 first-type identifiers.

According to one aspect of the present disclosure, the phrase that the first identifier is associated with the second identifier set means: the second identifier set comprises Q1 second-type identifiers, the Q1 second-type identifiers being respectively used to indicate Q1 second-type reference signal resources, the first reference signal resource is not spatially related with any of the Q1 second-type reference signal resources.

According to one aspect of the present disclosure, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

According to one aspect of the present disclosure, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

According to one aspect of the present disclosure, the executing is receiving, time-domain resources occupied by the first signal and time-domain resources occupied by the second signal are overlapping.

According to one aspect of the present disclosure, the first identifier is used to activate the second identifier set in the second link.

According to one aspect of the present disclosure, K1 is equal to Q1, the K1 first-type identifiers are respectively associated with the Q1 second-type identifiers, a position of the first identifier among the K1 first-type identifiers being the same as that of the second identifier among the Q1 second-type identifiers.

According to one aspect of the present disclosure, the first node autonomously determines the second identifier out of the second identifier set.

According to one aspect of the present disclosure, a pathloss from the second node to the first node is a first pathloss, the executing refers to receiving, a transmit power value of the first signal is related to the first pathloss, and a transmit power value of the second signal is unrelated to the first pathloss.

The present disclosure provides a method in a third node for wireless communications, comprising:

receiving a second signal in a second link;

herein, a transmitter for the second signal is a first node, the first node receives a first signaling in a first link, and the first node operates a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and the third node are Non-Co-located.

According to one aspect of the present disclosure, comprising:

receiving a second signaling in the second link;

herein, the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1.

According to one aspect of the present disclosure, the phrase that the first identifier is associated with the second identifier set means: the second identifier set comprises Q1 second-type identifiers, the Q1 second-type identifiers being respectively used to indicate Q1 second-type reference signal resources, the first reference signal resource is not spatially related with any of the Q1 second-type reference signal resources.

According to one aspect of the present disclosure, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

According to one aspect of the present disclosure, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

According to one aspect of the present disclosure, the operating is transmitting, time-domain resources occupied by the first signal and time-domain resources occupied by the second signal are overlapping.

According to one aspect of the present disclosure, the first identifier is used to activate the second identifier set in the second link.

According to one aspect of the present disclosure, K1 is equal to Q1, the K1 first-type identifiers are respectively associated with the Q1 second-type identifiers, a position of the first identifier among the K1 first-type identifiers being the same as that of the second identifier among the Q1 second-type identifiers.

The present disclosure provides a first node for wireless communications, comprising:

a first receiver, receiving a first signaling in a first link; and a first transceiver, operating a first signal in a first link and transmitting a second signal in a second link;

herein, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and a receiver for the second signal are Non-Co-located.

The present disclosure provides a second node for wireless communications, comprising:

a first transmitter, transmitting a first signaling in a first link; and a second transceiver, executing a first signal in a first link;

herein, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a receiver for the first signaling includes a first node, the first node transmitting a second signal in a second link, a DMRS for a channel occupied by the second signal and the second reference signal resource are QCL; the first link is used for cellular communications, while the second link is used for communications other than cellular communications; the executing is transmitting, or the executing is receiving; a receiver for the first signal and a receiver for the second signal are Non-Co-located.

The present disclosure provides a third node for wireless communications, comprising:

a second receiver, receiving a second signal in a second link;

herein, a transmitter for the second signal is a first node, the first node receives a first signaling in a first link, and the first node operates a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and the third node are Non-Co-located.

In one embodiment, compared with the prior art, the present disclosure is advantageous in the following aspects:

when the base station indicates to the first node through the first identifier which beam is to be employed in a first link, the first identifier also indicates a beam set employed by the first node in the second link, that is, the second identifier set; —namely, a beam used for the first link and a beam used for the second link can both be determined through the first identifier;

associating the first identifier with the second identifier set can further ensure that no interference will occur between the beam in cellular link which adopts the first identifier and the beam in sidelink which adopts the second identifier set, thus enhancing the transmission performance;

on the premise that sidelink transmission and cellular transmission are certainly not interfered by each other, the first node can transmit the first signal and the second signal simultaneously to improve the spectrum efficiency;

when the first signal and the second signal are not spatially related, a transmit power value of the second signal won't be affected by the pathloss in cellular link, which in turn ensures the transmission performance in the sidelink.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a flowchart of a first signaling according to another embodiment of the present disclosure.

FIG. 7 illustrates a schematic diagram of a first identifier and a second identifier set according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
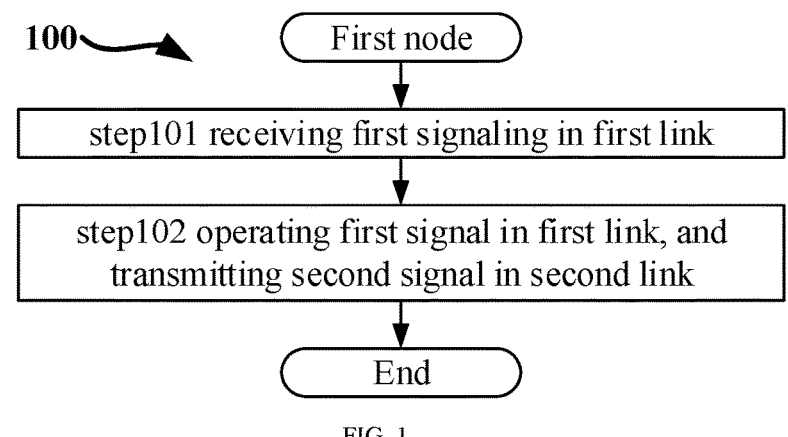
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, the first node in the present disclosure receives a first signaling in a first link in step 101; operates a first signal in the first link and transmits a second signal in a second link in step 102.

In Embodiment 1, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and a receiver for the second signal are Non-Co-located.

In one embodiment, the first link is for the Uu interface.

In one embodiment, the first link is for the Uu Link.

In one embodiment, the first link is for communications between the terminal and the base station.

In one embodiment, the first signaling is a physical layer signaling.

In one embodiment, the first signaling is a MAC CE.

In one embodiment, the first signaling is a DCI.

In one embodiment, the first signaling is a DL Grant.

In one embodiment, the first signaling is a UL Grant.

In one embodiment, a physical layer channel bearing the first signaling comprises a Physical Downlink Control Channel (PDCCH).

In one embodiment, the first signal is a baseband signal, or the first signal is a radio signal.

In one embodiment, a physical layer channel bearing the first signal comprises a Physical Downlink Shared Channel (PDSCH).

In one embodiment, a transport layer channel bearing the first signal comprises a Downlink Shared Channel (DL-SCH).

In one embodiment, a physical layer channel bearing the first signal comprises a Physical Uplink Shared Channel (PUSCH).

In one embodiment, a transport layer channel bearing the first signal comprises an Uplink Shared Channel (UL-SCH).

In one embodiment, the first signal is generated by a Transmission Block (TB).

In one embodiment, the first signaling is used for scheduling the first signal.

In one embodiment, the first signaling is used for scheduling the first signal.

In one embodiment, the first signaling is used for indicating at least one of frequency-domain resources occupied by the first signal or time-domain resources occupied by the first signal.

In one embodiment, the first signaling is used for indicating at least one of a Modulation and Coding Scheme (MSC) adopted by the first signal, a Redundancy Version (RV) adopted by the first signal or a Hybrid Automatic Repeat reQuest (HARQ) process number adopted by the first signal.

In one embodiment, the second link is for the PC5 interface.

In one embodiment, the second link is for the sidelink.

In one embodiment, the second link is for communications between the terminals.

In one embodiment, the second link is used for V2X communications.

In one embodiment, the second link is for communications between the terminal and a node which is not a base station.

In one embodiment, the second signal is a baseband signal, or the second signal is a radio signal.

In one embodiment, a physical layer channel bearing the second signal comprises a Physical Sidelink Shared Channel (PSSCH).

In one embodiment, a transport layer channel bearing the second signal comprises a Sidelink Shared Channel (SL-SCH).

In one embodiment, a physical layer channel bearing the second signal comprises a Physical Sidelink Feedback Channel (PSFCH).

In one embodiment, the second signal is generated by a Transport Block (TB).

In one embodiment, the first signaling is used for indicating the first identifier.

In one embodiment, the first signaling comprises a first field, the first field being used to indicate the first identifier.

In one embodiment, the first identifier is a non-negative integer.

In one embodiment, the first identifier is a Transmission Configuration Indication (TCI).

In one embodiment, the first identifier is a Sounding Reference Signal Resource Indicator (SRI).

In one embodiment, the first reference signal resource comprises at least one of a Channel State Information-Reference Signal (CSI-RS) resource or a Synchronization Signal/physical broadcast channel Block (SSB).

In one embodiment, the first reference signal resource comprises a Sounding Reference Signal (SRS) resource.

In one embodiment, the phrase that "the first reference signal resource is used to determine a spatial filter for a Demodulation Reference Signal (DMRS) for a channel occupied by the first signal" includes a meaning that: the first reference signal resource and the DMRS for the channel occupied by the first signal are QCL.

In one embodiment, the phrase that "the first reference signal resource is used to determine a spatial filter for a Demodulation Reference Signal (DMRS) for a channel occupied by the first signal" includes a meaning that: a Spatial Rx Parameter of the first reference signal resource is used for reception of the DMRS for the channel occupied by the first signal.

In one embodiment, the phrase that "the first reference signal resource is used to determine a spatial filter for a Demodulation Reference Signal (DMRS) for a channel occupied by the first signal" includes a meaning that: a Spatial Rx Parameter of the first reference signal resource is used for transmission of the DMRS for the channel occupied by the first signal.

In one embodiment, the phrase that "the first reference signal resource is used to determine a spatial filter for a Demodulation Reference Signal (DMRS) for a channel occupied by the first signal" includes a meaning that: a Spatial Tx Parameter of the first reference signal resource is used for transmission of the DMRS for the channel occupied by the first signal.

In one embodiment, the phrase that "the first reference signal resource is used to determine a spatial filter for a Demodulation Reference Signal (DMRS) for a channel occupied by the first signal" includes a meaning that: the first node receives a radio signal in the first reference signal resource and the DMRS for the channel occupied by the first signal using a same beam.

In one embodiment, the phrase that "the first reference signal resource is used to determine a spatial filter for a Demodulation Reference Signal (DMRS) for a channel occupied by the first signal" includes a meaning that: the first node transmits a radio signal in the first reference signal resource and the DMRS for the channel occupied by the first signal using a same beam.

In one embodiment, the phrase that "the first reference signal resource is used to determine a spatial filter for a Demodulation Reference Signal (DMRS) for a channel occupied by the first signal" includes a meaning that: the first reference signal resource has a Spatial Relation to the DMRS for the channel occupied by the first signal.

In one embodiment, the phrase that "the first identifier is used to determine the second identifier set" includes a meaning that: the second identifier set comprises Q1 second-type identifiers, Q1 being a positive integer greater than 1, when the first identifier is indicated, each and every one of the Q1 second-type identifiers will be activated.

In one embodiment, the phrase that "the first identifier is used to determine the second identifier set" includes a meaning that: the second identifier set comprises a second identifier, when the first identifier is indicated, the second identifier will be activated.

In one embodiment, the phrase that "the first identifier is used to determine the second identifier set" includes a meaning that: the first identifier is associated with the second identifier set, when the first identifier is indicated, the second identifier set will be activated.

In one embodiment, the second identifier set comprises Q1 second-type identifiers, Q1 being a positive integer, each of the Q1 second-type identifiers being used for the second link.

In one embodiment, the second identifier set comprises Q1 second-type identifiers, Q1 second-type identifiers being respectively used to indicate Q1 second-type reference signal resources, Q1 being a positive integer, any of the Q1 second-type reference signal resources comprises at least one of a CSI-RS resource for sidelink or a synchronization signal for sidelink.

In one embodiment, the second identifier is a non-negative integer.

In one embodiment, the second identifier is a TCI for sidelink.

In one embodiment, the second identifier is an SRI for sidelink.

In one embodiment, the second reference signal resource comprises at least one of a CSI-RS resource for sidelink or a synchronization signal for sidelink.

In one embodiment, the operating is receiving, a receiver for the first signal including the first node; or, the operating is transmitting, a receiver for the first signal including a base station.

In one embodiment, a receiver for the second signal includes a terminal.

Embodiment 2

Figure 2:
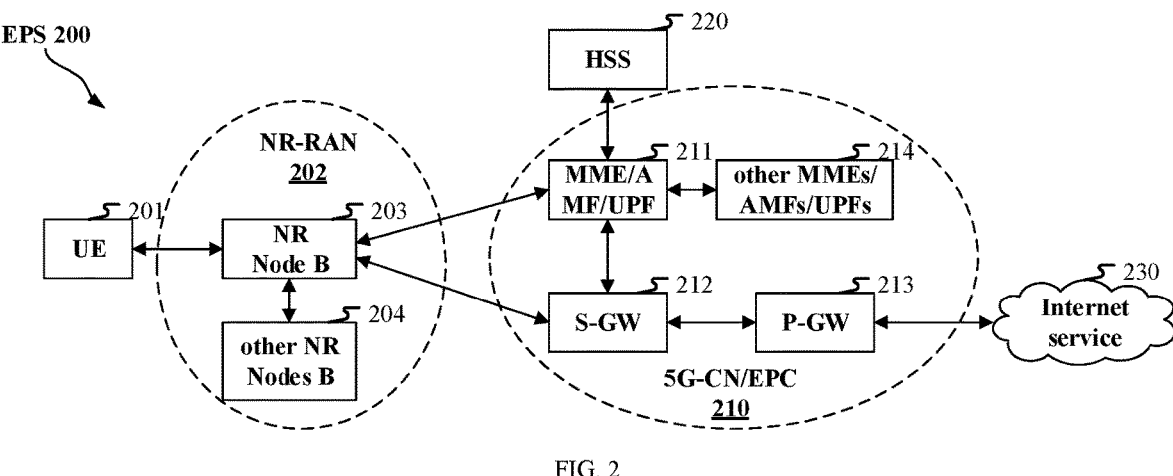
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one UE 201, an NG-RAN 202, an Evolved Packet Core/5G-Core Network (EPC-5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a terminal with multiple radio frequency capabilities in uplink.

In one embodiment, the UE 201 is a terminal capable of transmitting multiple beams simultaneously in uplink.

In one embodiment, the UE 201 is a terminal supporting Massive-MIMO in uplink.

In one embodiment, the gNB203 corresponds to the second node in the present disclosure.

In one embodiment, the gNB203 is capable of receiving multiple beams simultaneously.

In one embodiment, the gNB203 supports Multi-TRP.

In one embodiment, the gNB203 supports multi-beam transmission.

In one embodiment, the gNB203 supports Massive-MIMO-based transmission.

Embodiment 3

Figure 3:
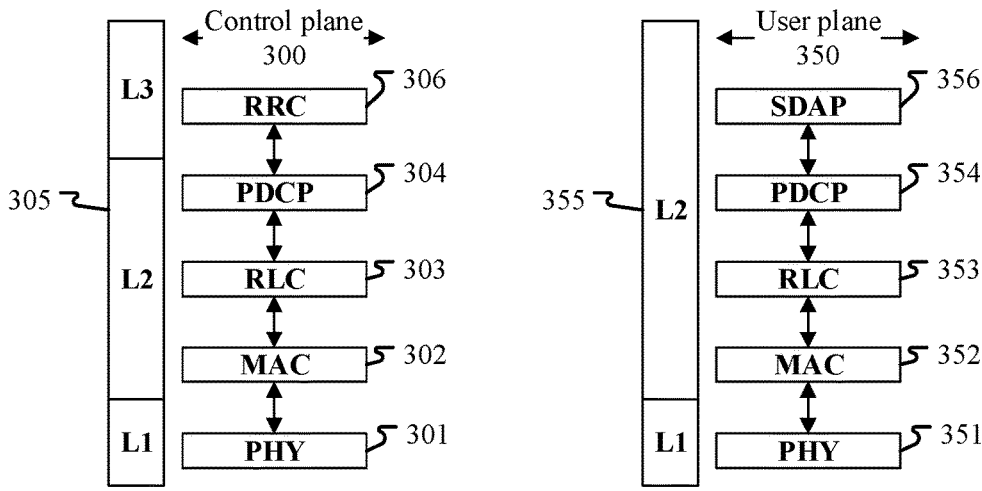
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present disclosure. which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node via the PHY 301. The L2 305 comprises a Medium Access Control (MAC) sublayer

302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets as well as support for inter-cell handover of the second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The Radio Resource Control (RRC) sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP304 of the second communication node is used for generating scheduling of the first communication node.

In one embodiment, the PDCP354 of the second communication node is used for generating scheduling of the first communication node.

In one embodiment, the first signaling in the present disclosure is generated by the PHY301 or the PHY351.

In one embodiment, the first signaling in the present disclosure is generate by the MAC302 or the MAC352.

In one embodiment, the first signaling in the present disclosure is generated by the RRC 306.

In one embodiment, the first signal in the present disclosure is generated by the PHY301 or the PHY351.

In one embodiment, the first signal in the present disclosure is generate by the MAC302 or the MAC352.

In one embodiment, the first signal in the present disclosure is generated by the RRC306.

In one embodiment, the second signaling in the present disclosure is generated by the PHY301 or the PHY351.

In one embodiment, the second signaling in the present disclosure is generate by the MAC302 or the MAC352.

In one embodiment, the second signaling in the present disclosure is generated by the RRC306.

In one embodiment, the second signal in the present disclosure is generated by the PHY301 or the PHY351.

In one embodiment, the second signal in the present disclosure is generate by the MAC302 or the MAC352.

In one embodiment, the second signal in the present disclosure is generated by the RRC306.

In one embodiment, the target information set in the present disclosure is generated by the RRC306.

In one embodiment, the target information set in the present disclosure is generate by the MAC302 or the MAC352.

In one embodiment, the first information set in the present disclosure is generated by the RRC306.

In one embodiment, the first information set in the present disclosure is generate by the MAC302 or the MAC352.

In one embodiment, the first node is a terminal.

In one embodiment, the first node is a vehicle.

In one embodiment, the second node is a Transmitter Receiver Point (TRP).

In one embodiment, the second node is a cell.

In one embodiment, the second node is an eNB.

In one embodiment, the second node is a base station.

In one embodiment, the third node is a terminal.

In one embodiment, the third node is a Road Side Unit (RSU).

In one embodiment, the third node is a Grouphead.

Embodiment 4

Figure 4:
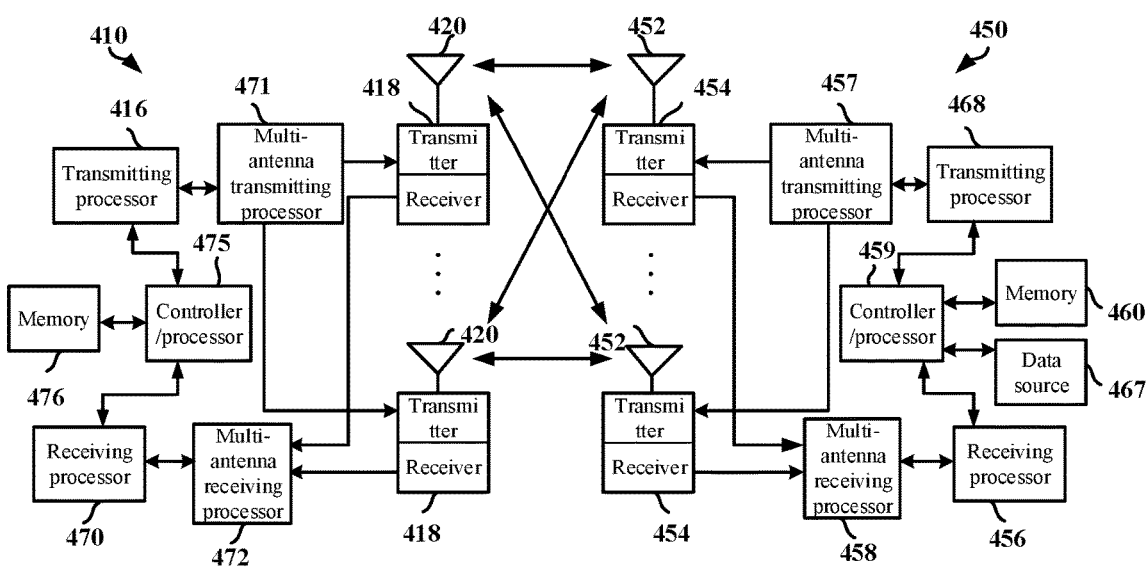
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first signaling in a first link; and operates a first signal in a first link and transmits a second signal in a second link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and a receiver for the second signal are Non-Co-located.

In one embodiment, the first communication node 450 comprises a memory that stores a computer readable instruction program, the computer readable instruction program generates actions when executed by at least one processor, which include: receiving a first signaling in a first link; and operating a first signal in a first link and transmitting a second signal in a second link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and a receiver for the second signal are Non-Co-located.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling in a first link, and executes a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a receiver for the first signaling includes a first node, the first node transmitting a second signal in a second link, a DMRS for a channel occupied by the second signal and the second reference signal resource are QCL; the first link is used for cellular communications, while the second link is used for communications other than cellular communications; the executing is transmitting, or the executing is receiving; a receiver for the first signal and a receiver for the second signal are Non-Co-located.

In one embodiment, the second communication device 410 comprises a memory that stores a computer readable instruction program, the computer readable instruction program generates actions when executed by at least one processor, which include: transmitting a first signaling in a first link, and executing a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a receiver for the first signaling includes a first node, the first node transmitting a second signal in a second link, a DMRS for a channel occupied by the second signal and the second reference signal resource are QCL; the first link is used for cellular communications, while the second link is used for communications other than cellular communications; the executing is transmitting, or the executing is receiving; a receiver for the first signal and a receiver for the second signal are Non-Co-located.

In one embodiment, the second communication device 410 comprises at least one processor and at least one memory, the at least one memory comprises computer program codes; the at least one memory and the computer program codes are configured to be used in collaboration with the at least one processor. The second communication device 410 at least receives a second signal in a second link; a transmitter for the second signal is a first node, the first node receives a first signaling in a first link, and the first node operates a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and the third node are Non-Co-located.

In one embodiment, the second communication device 410 comprises a memory that stores a computer readable instruction program, the computer readable instruction program generates actions when executed by at least one processor, which include: receiving a second signal in a second link; a transmitter for the second signal is a first node, the first node receives a first signaling in a first link, and the first node operates a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and the third node are Non-Co-located.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is network equipment.

In one embodiment, the second communication device 410 is a serving cell.

In one embodiment, the second communication device 410 is a TRP.

In one embodiment, the second communication device 410 is an RSU.

In one embodiment, at least the first four of the antenna 452, the receiver 454, the multi-antenna receiving processor 458, the receiving processor 456, and the controller/processor 459 are used for receiving a first signaling in a first link; at least the first four of the antenna 420, the transmitter 418, the multi-antenna transmitting processor 471, the transmitting processor 416 and the controller/processor 475 are used for transmitting a first signaling in a first link.

In one embodiment, at least the first four of the antenna 452, the receiver 454, the multi-antenna receiving processor 458, the receiving processor 456, and the controller/processor 459 are used for receiving a first signal in a first link; at least the first four of the antenna 420, the transmitter 418, the multi-antenna transmitting processor 471, the transmitting processor 416 and the controller/processor 475 are used for transmitting a first signal in a first link.

In one embodiment, at least the first four of the antenna 452, the transmitter 454, the multi-antenna transmitting processor 457, the transmitting processor 468 or the controller/processor 459 are used for transmitting a first signal in a first link; at least the first four of the antenna 420, the receiver 418, the multi-antenna receiving processor 472, the receiving processor 470 or the controller/processor 475 are used for receiving a first signal in a first link.

In one embodiment, at least the first four of the antenna 452, the transmitter 454, the multi-antenna transmitting processor 457, the transmitting processor 468 or the controller/processor 459 are used for transmitting a second signal in a second link; at least the first four of the antenna 420, the receiver 418, the multi-antenna receiving processor 472, the receiving processor 470 or the controller/processor 475 are used for receiving a second signal in a second link.

In one embodiment, at least the first four of the antenna 452, the transmitter 454, the multi-antenna transmitting processor 457, the transmitting processor 468 or the controller/processor 459 are used for transmitting a second signaling in a second link; at least the first four of the antenna 420, the receiver 418, the multi-antenna receiving processor 472, the receiving processor 470 or the controller/processor 475 are used for receiving a second signaling in a second link.

In one embodiment, at least the first four of the antenna 452, the receiver 454, the multi-antenna receiving processor 458, the receiving processor 456, and the controller/processor 459 are used for receiving a target information set; at least the first four of the antenna 420, the transmitter 418, the multi-antenna transmitting processor 471, the transmitting processor 416 and the controller/processor 475 are used for transmitting a target information set.

In one embodiment, at least the first four of the antenna 452, the receiver 454, the multi-antenna receiving processor 458, the receiving processor 456, and the controller/processor 459 are used for receiving a first information set; at least the first four of the antenna 420, the transmitter 418, the multi-antenna transmitting processor 471, the transmitting processor 416 and the controller/processor 475 are used for transmitting a first information set.

Embodiment 5

Figure 5:
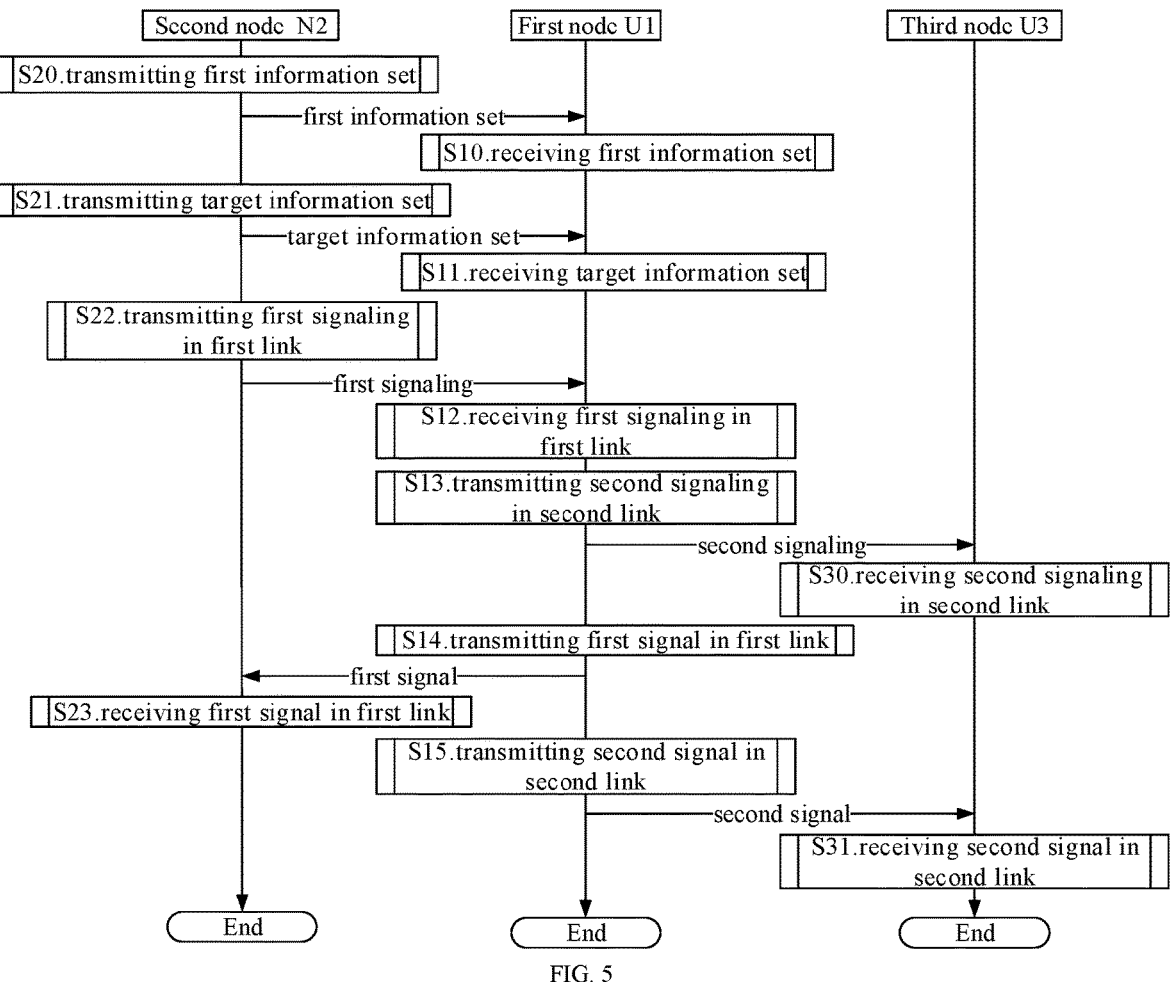
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node N2 are in communication via a radio link, and the first node U1 and a third node are in communication via a radio link. It should be particularly noted that the sequence illustrated herein does not set any limit to the signal transmission order or implementation order in the present disclosure.

The first node U1 receives a first information set in step S10; and receives a target information set in step S11; receives a first signaling in a first link in step S12; transmits a second signaling in a second link in step S13; transmits a first signal in a first link in step S14; and transmits a second signal in a second link in step S15.

The second node N2 transmits a first information set in step S20; and transmits a target information set in step S21; transmits a first signaling in a first link in step S22; and receives a first signal in a first link in step S23.

The third node U3 receives a second signaling in a second link in step S30; and receives a second signal in a second link in step S31.

In Embodiment 5, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; a receiver for the first signal and a receiver for the second signal are Non-Co-located; the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1; the target information set is used to indicate that the first identifier is associated with the second identifier set; the first information set is used to indicate a first identifier set, the first identifier set comprising K1 first-type identifiers; K1 is a positive integer greater than 1; the first identifier is a first-type identifier among the K1 first-type identifiers; the first signaling is used to indicate the first identifier from the K1 first-type identifiers.

In one embodiment, the second signaling is a piece of Sidelink Control Information (SCI).

In one embodiment, the second signaling is used for scheduling the second signal.

In one embodiment, the second signaling comprises a second field, the second field being used to indicate the second identifier.

In one embodiment, the second time-frequency resource set comprises more than one Resource Element (RE).

In one embodiment, information bits carried by the second signaling come from the transmitter for the first signaling.

In one embodiment, the second time-frequency resource set is based on resources allocation in mode 1.

In one embodiment, time-frequency resources occupied by the second time-frequency resource set are determined by the transmitter for the first signaling.

In one embodiment, time-frequency resources occupied by the second time-frequency resource set are indicated by the transmitter for the first signaling.

In one embodiment, the Q1 second-type identifiers are respectively Q1 non-negative integers.

In one embodiment, the target information set is carried by an RRC signaling.

In one embodiment, the target information set is carried by a MAC CE.

In one embodiment, the first identifier is used to indicate a first reference signal resource, the second identifier set comprises Q1 second-type identifiers, the Q1 second-type identifiers being respectively used to indicate Q1 second-type reference signal resources, the target information set is used to indicate that the first reference signal resource is spatially related with the Q1 second-type reference signal resources.

In one embodiment, the first information set is carried by an RRC signaling.

In one embodiment, the first information set is carried by a MAC CE.

in one embodiment, the K1 first-type identifiers are respectively used to indicate K1 first-type reference signal resources, and any of the K1 first-type reference signal resources comprises at least one of a CSI-RS resource or an SSB.

In one embodiment, the K1 first-type identifiers are respectively K1 non-negative integers.

In one embodiment, the phrase that the first identifier is associated with the second identifier set means:

the second identifier set comprises Q1 second-type identifiers, the Q1 second-type identifiers being respectively used to indicate Q1 second-type reference signal resources, the first reference signal resource is not spatially related with any of the Q1 second-type reference signal resources.

In one subembodiment, the phrase that "the first reference signal resource is not spatially related with any of the Q1 second-type reference signal resources" means that: the first reference signal resource is not QCL with any of the Q1 second-type reference signal resources.

In one subembodiment, the phrase that "the first reference signal resource is not spatially related with any of the Q1 second-type reference signal resources" means that: any radio signal transmitted in the first reference signal resource won't interfere with any radio signal transmitted in any of the Q1 second-type reference signal resources.

In one subembodiment, the phrase that "the first reference signal resource is not spatially related with any of the Q1 second-type reference signal resources" means that: any radio signal transmitted in the first reference signal resource can be transmitted by the first node synchronously with any radio signal transmitted in any of the Q1 second-type reference signal resources.

In one subembodiment, the phrase that "the first reference signal resource is not spatially related with any of the Q1 second-type reference signal resources" means that: any radio signal transmitted in the first reference signal resource can be received synchronously with any radio signal transmitted in any of the Q1 second-type reference signal resources.

In one embodiment, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

In one subembodiment, the target reference signal resource comprises at least one of a CSI-RS resource for sidelink or a synchronization signal for sidelink.

In one subembodiment, the phrase that "the target reference signal resource is not spatially related with any of the Q1 second-type reference signal resources" means that: the target reference signal resource is not QCL with any of the Q1 second-type reference signal resources.

In one subembodiment, the phrase that "the target reference signal resource is not spatially related with any of the Q1 second-type reference signal resources" means that: any radio signal transmitted in the target reference signal resource won't interfere with any radio signal transmitted in any of the Q1 second-type reference signal resources.

In one subembodiment, the phrase that "the target reference signal resource is not spatially related with any of the Q1 second-type reference signal resources" means that: any radio signal transmitted in the target reference signal resource can be transmitted by the first node synchronously with any radio signal transmitted in any of the Q1 second-type reference signal resources.

In one subembodiment, the phrase that "the target reference signal resource is not spatially related with any of the Q1 second-type reference signal resources" means that: any radio signal transmitted in the target reference signal resource can be received synchronously with any radio signal transmitted in any of the Q1 second-type reference signal resources.

In one embodiment, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

In one subembodiment, the phrase that "any of the K1 first-type reference signal resources is not spatially related with any of the Q1 second-type reference signal resources" means that: any of the K1 first-type reference signal resources is not QCL with any of the Q1 second-type reference signal resources.

In one subembodiment, the phrase that "any of the K1 first-type reference signal resources is not spatially related with any of the Q1 second-type reference signal resources" means that: any radio signal transmitted in any of the K1 first-type reference signal resources won't interfere with any radio signal transmitted in any of the Q1 second-type reference signal resources.

In one subembodiment, the phrase that "any of the K1 first-type reference signal resources is not spatially related with any of the Q1 second-type reference signal resources" means that: any radio signal transmitted in any of the K1 first-type reference signal resources can be transmitted by the first node synchronously with any radio signal transmitted in any of the Q1 second-type reference signal resources.

In one subembodiment, the phrase that "any of the K1 first-type reference signal resources is not spatially related with any of the Q1 second-type reference signal resources" means that: any radio signal transmitted in any of the K1 first-type reference signal resources can be received synchronously with any radio signal transmitted in any of the Q1 second-type reference signal resources.

In one embodiment, time-domain resources occupied by the first signal and time-domain resources occupied by the second signal are overlapping.

In one subembodiment, the first signal occupies M1 Orthogonal Frequency Division Multiplexing (OFDM) symbols, while the second signal occupies M2 OFDM symbols, where M1 and M2 are non-negative integers, there is at least one OFDM symbol among the M1 OFDM symbols being one of the M2 OFDM symbols.

In one subembodiment, time-domain resources occupied by the first signal and time-domain resources occupied by the second signal belong to a same slot.

In one subembodiment, the first signal and the second signal at least occupy one same OFDM symbol in time domain.

In one subembodiment, frequency-domain resources occupied by the first signal and frequency-domain resources occupied by the second signal are orthogonal in frequency domain.

In one embodiment, the first identifier is used to activate the second identifier set in the second link.

In one subembodiment, time-domain resources occupied by the first signaling are used to determine a first instant of time, and time-domain resources occupied by the second signal are later than the first instant of time.

In one subembodiment, the second identifier set being activated is only effective in a first time window, the first time window occupying multiple slots consecutive in time domain.

In one subsidiary embodiment of the above two subembodiments, a start of the first time window in time domain is the first instant of time.

In one subembodiment, the first signaling is used to activate the second identifier set in the second link.

In one subembodiment, the activation of the second identifier set by the first signaling in the second link becomes effective since the first instant of time; time-domain resources occupied by the first signaling are used to determine the first instant of time.

In one embodiment, K1 is equal to Q1, the K1 first-type identifiers are respectively associated with the Q1 second-type identifiers, a position of the first identifier among the K1 first-type identifiers being the same as that of the second identifier among the Q1 second-type identifiers.

In one subembodiment, the K1 first-type identifiers respectively correspond to the Q1 second-type identifiers.

In one subembodiment, the first identifier is an X-th first-type identifier among the K1 first-type identifiers, and the second identifier is an X-th second-type identifier among the Q1 second-type identifiers, X being a positive integer greater than 0 and no greater than K1.

In one subembodiment, the K1 first-type identifiers are respectively used to indicate K1 first-type reference signal resources, the Q1 second-type identifiers are respectively used to indicate Q1 second-type reference signal resources, and the K1 first-type reference signal resources are respectively associated with the Q1 second-type reference signal resources.

In one embodiment, the first node U1 autonomously determines the second identifier out of the second identifier set.

In one subembodiment, the phrase that "the first node U1 autonomously determines the second identifier out of the second identifier set" means that: the second identifier is not indicated by the network side.

In one subembodiment, the phrase that "the first node U1 autonomously determines the second identifier out of the second identifier set" means that: the second identifier is not indicated by the base station side.

In one embodiment, the QCL type in the present disclosure includes QCL Type D.

In one embodiment, the QCL type in the present disclosure includes QCL Type A.

In one embodiment, the QCL type in the present disclosure includes QCL Type B.

In one embodiment, the QCL type in the present disclosure includes QCL Type C.

In one embodiment, the step S14 is taken before the step S13 and after the step S12.

In one embodiment, the step S24 is taken before the step S23 and after the step S22.

Embodiment 6

Embodiment 6 illustrates a flowchart of a first radio signal and a second radio signal, as shown in FIG. 6. In FIG. 6, a first node U3 and a second node N4 are in communication via a radio link. It should be particularly noted that the sequence illustrated herein does not set any limit to the signal transmission order or implementation order in the present disclosure; in case of no conflict, the embodiments, subembodiments, and subsidiary embodiments in Embodiment 5 are also applicable to Embodiment 6; contrariwise, the embodiments, subembodiments, and subsidiary embodiments in Embodiment 6 are also applicable to Embodiment 5.

The first node U4 receives a first information set in step S40; and receives a target information set in step S41; receives a first signaling in a first link in step S42; receives a first signal in a first link in step S43; transmits a second signaling in a second link in step S44; and transmits a second signal in a second link in step S45.

The second node N5 transmits a first information set in step S50; and transmits a target information set in step S51; transmits a first signaling in a first link in step S52; and transmits a first signal in a first link in step S53.

The third node U6 receives a second signaling in a second link in step S60; and receives a second signal in a second link in step S61.

In Embodiment 6, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; a receiver for the first signal and a receiver for the second signal are Non-Co-located; the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1; the target information set is used to indicate that the first identifier is associated with the second identifier set; the first information set is used to indicate a first identifier set, the first identifier set comprising K1 first-type identifiers; K1 is a positive integer greater than 1; the first identifier is a first-type identifier among the K1 first-type identifiers; the first signaling is used to indicate the first identifier from the K1 first-type identifiers.

Embodiment 7

Embodiment 7 illustrates a schematic diagram of a first identifier and a second identifier set, as shown in FIG. 7. In FIG. 7, the second identifier set comprises Q1 second-type identifiers, the first identifier corresponds to a first beamforming vector illustrated in the figure, and the Q1 second-type identifiers respectively correspond to Q1 second-type beamforming vectors, the first beamforming vector not being spatially related with any of the Q1 second-type beamforming vectors; the first identifier is associated with a first reference signal resource, and the Q1 second-type beamforming vectors are respectively associated with Q1 second-type reference signal resources.

In one embodiment, the first node comprises two RF Channels, and the two RF Channels are respectively used to transmit the first beamforming vector and at least one of the Q1 second-type beamforming vectors.

In one embodiment, the first reference signal resource is used for cellular link.

In one embodiment, the Q1 second-type reference signal resources are used for sidelink.

In one embodiment, among the Q1 second-type reference signal resources there is at least one second-type reference signal resource being used for sidelink.

In one embodiment, among the Q1 second-type reference signal resources there is at least one second-type reference signal resource being used for cellular link.

Embodiment 8

Figures 8, 9, 10, 11:
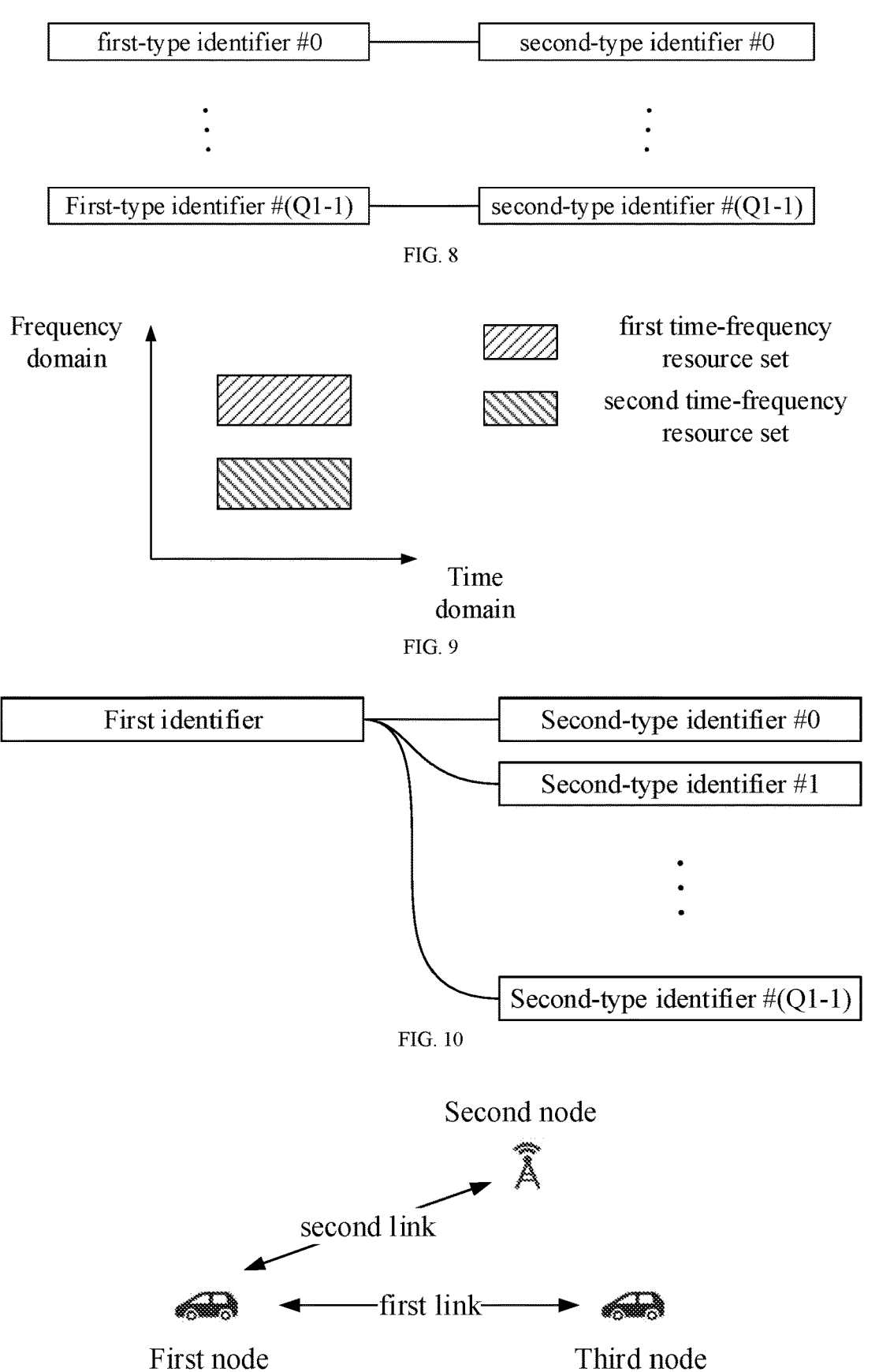
FIG. 8 illustrates a schematic diagram of a first identifier set and a second identifier set according to one embodiment of the present disclosure.
FIG. 9 illustrates a schematic diagram of a first signal and a second signal according to one embodiment of the present disclosure.
FIG. 10 illustrates a schematic diagram of a target information set according to one embodiment of the present disclosure.
FIG. 11 illustrates a schematic diagram of an application scenario according to one embodiment of the present disclosure.

Embodiment 8 illustrates a schematic diagram of a first identifier set and a second identifier set, as shown in FIG. 8. In FIG. 8, the first identifier set comprises Q1 first-type identifiers, and the second identifier set comprises Q1 second-type identifiers, the Q1 first-type identifiers respectively corresponding to the Q1 second-type identifiers. The Q1 first-type identifiers include a first-type identifier #0 through a first-type identifier #(Q1-1), and the Q1 second-type identifiers include a second-type identifier #0 through a second-type identifier #(Q1-1).

In one embodiment, the first field in the first signaling comprises a same number of information bits as the second field in the second signaling.

In one embodiment, any of the Q1 first-type identifiers is a non-negative integer.

In one embodiment, any of the Q1 second-type identifiers is a non-negative integer.

In one embodiment, any of the Q1 first-type identifiers is used to indicate a reference signal resource used for cellular link.

In one embodiment, any of the Q1 second-type identifiers is used to indicate a reference signal resource used for sidelink.

In one embodiment, the Q1 first-type identifiers are respectively Q1 TCI-States for cellular link.

In one embodiment, the Q1 second-type identifiers are respectively Q1 TCI-States for sidelink.

In one embodiment, the Q1 first-type identifiers are respectively Q1 Transmission Configuration Indication-States (TCI-States).

In one embodiment, the Q1 second-type identifiers are respectively Q1 TCI-States.

In one embodiment, the Q1 first-type identifiers are respectively Q1 TCI-StateIDs.

In one embodiment, the Q1 second-type identifiers are respectively Q1 TCI-StateIDs.

Embodiment 9

Embodiment 9 illustrates a schematic diagram of a first signal and a second signal, as shown in FIG. 9. In FIG. 9, the first signal occupies a first time-frequency resource set, while the second signal occupies a second time-frequency resource set; the first time-frequency resource set and the second time-frequency resource set belong to a same slot.

In one embodiment, the first time-frequency resource set occupies more than one Resource Element (RE).

In one embodiment, the second time-frequency resource set occupies more than one Resource Element (RE).

In one embodiment, the first signaling is used to indicate time-domain resources occupied by the first time-frequency resource set.

In one embodiment, the first signaling is used to indicate frequency-domain resources occupied by the first time-frequency resource set.

In one embodiment, the second signaling is used to indicate time-domain resources occupied by the second time-frequency resource set.

In one embodiment, the second signaling is used to indicate frequency-domain resources occupied by the second time-frequency resource set.

Embodiment 10

Embodiment 10 illustrates a schematic diagram of a target information set, as shown in FIG. 10. In FIG. 10, the target information set is used to indicate that the first identifier is associated with the second identifier set, the second identifier set comprising Q1 second-type identifiers, respectively corresponding to second-type identifier #0 through second-type identifier #(Q1-1) in the figure.

In one embodiment, the target information set is an RRC signaling.

In one embodiment, the target information set is a MAC CE.

Embodiment 11

Embodiment 11 illustrates a schematic of an application scenario, as shown in FIG. 11. In FIG. 11, the first node is a terminal, the second node is a base station, and the third node is a terminal; the first node is in cellular communication with the second node, and the first node is in V2X communication with the third node; a link between the first node and the second node is a first link, and a link between the first node and the third node is a second link.

In one embodiment, the second node bears a serving cell of the first node.

In one embodiment, the second node bears a serving cell of the third node.

In one embodiment, the first node and the third node respectively belong to different serving cells.

Embodiment 12

Figure 12:
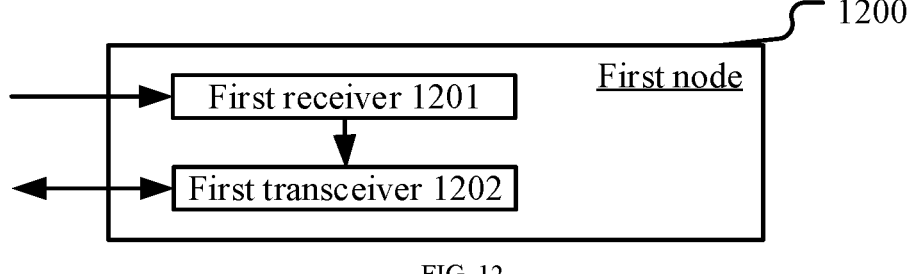
FIG. 12 illustrates a structure block diagram of a processing device in a first node according to one embodiment of the present disclosure.

Embodiment 12 illustrates a structure block diagram of a first node, as shown in FIG. 12. In FIG. 12, a first node 1200 is comprised of a first receiver 1201 and a first transceiver 1202.

The first receiver 1201 receives a first signaling in a first link; and the first transceiver 1202 operates a first signal in a first link and transmits a second signal in a second link.

In Embodiment 12, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and a receiver for the second signal are Non-Co-located.

In one embodiment, the first transceiver 1202 transmits a second signaling in the second link; the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1.

In one embodiment, the first receiver 1201 receives a target information set; the target information set is used to indicate that the first identifier is associated with the second identifier set.

In one embodiment, the first receiver 1201 receives a first information set; the first information set is used to indicate a first identifier set, the first identifier set comprising K1 first-type identifiers; K1 is a positive integer greater than 1; the first identifier is a first-type identifier among the K1 first-type identifiers; the first signaling is used to indicate the first identifier from the K1 first-type identifiers.

In one embodiment, the phrase that the first identifier is associated with the second identifier set means: the second identifier set comprises Q1 second-type identifiers, the Q1 second-type identifiers being respectively used to indicate Q1 second-type reference signal resources, the first reference signal resource is not spatially related with any of the Q1 second-type reference signal resources.

In one embodiment, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

In one embodiment, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

In one embodiment, the operating is transmitting, time-domain resources occupied by the first signal and time-domain resources occupied by the second signal are overlapping.

In one embodiment, the first identifier is used to activate the second identifier set in the second link.

In one embodiment, K1 is equal to Q1, the K1 first-type identifiers are respectively associated with the Q1 second-type identifiers, a position of the first identifier among the K1 first-type identifiers being the same as that of the second identifier among the Q1 second-type identifiers.

In one embodiment, the first node autonomously determines the second identifier out of the second identifier set.

In one embodiment, a pathloss from a transmitter for the first signaling to the first node is a first pathloss, the operating refers to transmitting, a transmit power value of the first signal is related to the first pathloss, and a transmit power value of the second signal is unrelated to the first pathloss.

In one embodiment, the first receiver 1201 comprises at least the first four of the antenna 452, the receiver 454, the multi-antenna receiving processor 458, the receiving processor 456 and the controller/processor 459 in Embodiment 4.

In one embodiment, the first transceiver 1202 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

Embodiment 13

Figure 13:
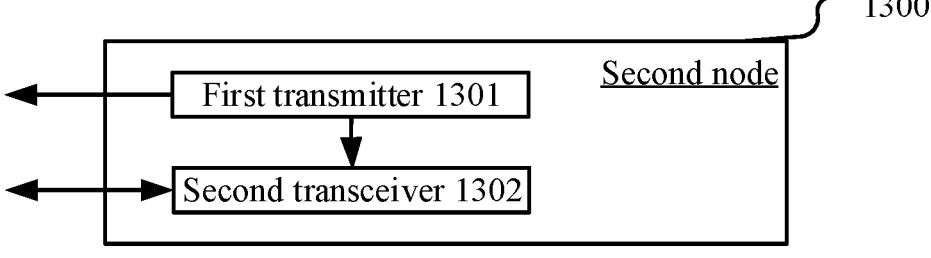
FIG. 13 illustrates a structure block diagram a processing device in a second node according to one embodiment of the present disclosure.

Embodiment 13 illustrates a structure block diagram of a second node, as shown in FIG. 13. In FIG. 13, a second node 1300 is comprised of a first transmitter 1301 and a second transceiver 1302.

The first transmitter 1301 transmits a first signaling in a first link; and the second transceiver 1302 executes a first signal in a first link.

In Embodiment 13, the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a receiver for the first signaling includes a first node, the first node transmitting a second signal in a second link, a DMRS for a channel occupied by the second signal and the second reference signal resource are QCL; the first link is used for cellular communications, while the second link is used for communications other than cellular communications; the executing is transmitting, or the executing is receiving; a receiver for the first signal and a receiver for the second signal are Non-Co-located.

In one embodiment, the first node transmits a second signaling in the second link; the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1.

In one embodiment, the first transmitter 1301 transmits a target information set; the target information set is used to indicate that the first identifier is associated with the second identifier set.

In one embodiment, the first transmitter 1301 transmits a first information set; the first information set is used to indicate a first identifier set, the first identifier set comprising K1 first-type identifiers; K1 is a positive integer greater than 1; the first identifier is a first-type identifier among the K1 first-type identifiers; the first signaling is used to indicate the first identifier from the K1 first-type identifiers.

In one embodiment, the phrase that the first identifier is associated with the second identifier set means: the second identifier set comprises Q1 second-type identifiers, the Q1 second-type identifiers being respectively used to indicate Q1 second-type reference signal resources, the first reference signal resource is not spatially related with any of the Q1 second-type reference signal resources.

In one embodiment, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

In one embodiment, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

In one embodiment, the executing is receiving, time-domain resources occupied by the first signal and time-domain resources occupied by the second signal are overlapping.

In one embodiment, the first identifier is used to activate the second identifier set in the second link.

In one embodiment, K1 is equal to Q1, the K1 first-type identifiers are respectively associated with the Q1 second-type identifiers, a position of the first identifier among the K1 first-type identifiers being the same as that of the second identifier among the Q1 second-type identifiers.

In one embodiment, the first node autonomously determines the second identifier out of the second identifier set.

In one embodiment, a pathloss from the second node to the first node is a first pathloss, the executing refers to receiving, a transmit power value of the first signal is related to the first pathloss, and a transmit power value of the second signal is unrelated to the first pathloss.

In one embodiment, the first transmitter 1301 comprises at least the first four of the antenna 420, the transmitter 418, the multi-antenna transmitting processor 471, the transmitting processor 416 and the controller/processor 475 in Embodiment 4.

In one embodiment, the second transceiver 1302 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

Embodiment 14

Figure 14:
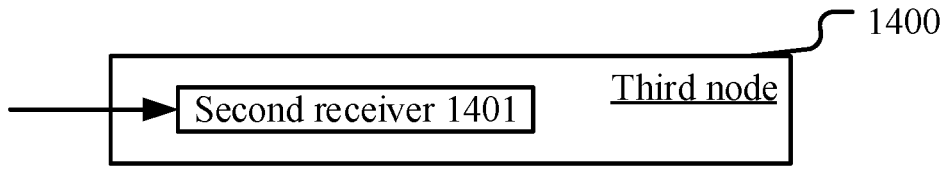
FIG. 14 illustrates a structure block diagram a processing device in a third node according to one embodiment of the present disclosure.

Embodiment 14 illustrates a structure block diagram of a third node, as shown in FIG. 14. In FIG. 14, a third node 1400 is comprised of a second receiver 1401.

The second receiver 1401 receives a second signal in a second link.

In Embodiment 14, a transmitter for the second signal is a first node, the first node receives a first signaling in a first link, and the first node operates a first signal in the first link; the first signaling is used to determine a first identifier, the first identifier being used to indicate a first reference signal resource; the first reference signal resource is used to determine a spatial filter for a Demodulation Reference Signal (DMRS) for a channel occupied by the first signal; the first identifier is used to determine a second identifier set; the second identifier set comprises a second identifier, the second identifier being used to indicate a second reference signal resource, a DMRS for a channel occupied by the second signal and the second reference signal resource are Quasi Co-located (QCL); the first link is used for cellular communications, while the second link is used for communications other than cellular communications; the operating is receiving, or the operating is transmitting; a receiver for the first signal and the third node are Non-Co-located.

In one embodiment, the second receiver 1401 receives a second signaling in the second link; the second signaling is used to indicate a second time-frequency resource set, and the second signal occupies the second time-frequency resource set; the second identifier set comprises Q1 second-type identifiers, the second identifier is a second-type identifier among the Q1 second-type identifiers, and the second signaling is used to indicate the second identifier from the Q1 second-type identifiers; Q1 is a positive integer greater than 1.

In one embodiment, the phrase that the first identifier is associated with the second identifier set means: the second identifier set comprises Q1 second-type identifiers, the Q1 second-type identifiers being respectively used to indicate Q1 second-type reference signal resources, the first reference signal resource is not spatially related with any of the Q1 second-type reference signal resources.

In one embodiment, the phrase that the first identifier is associated with the second identifier set means: the first reference signal resource and a target reference resource are QCL, the target reference signal resource is used for the second link, and the target reference signal resource is not spatially related with any of the Q1 second-type reference signal resources.

In one embodiment, the phrase that the first identifier is associated with the second identifier set means: the first identifier is a first-type identifier among K1 first-type identifiers comprised in a first identifier set, the K1 first-type identifiers being respectively used to indicate K1 first-type reference signal resources; the second identifier set comprises Q1 second-type identifiers, the Q1 second-type identifiers being respectively used to indicate Q1 second-type reference signal resources, any of the K1 first-type reference signal resources is not spatially related with any of the Q1 second-type reference signal resources.

In one embodiment, the operating is transmitting, time-domain resources occupied by the first signal and time-domain resources occupied by the second signal are overlapping.

In one embodiment, the first identifier is used to activate the second identifier set in the second link.

In one embodiment, K1 is equal to Q1, the K1 first-type identifiers are respectively associated with the Q1 second-type identifiers, a position of the first identifier among the K1 first-type identifiers being the same as that of the second identifier among the Q1 second-type identifiers.

In one embodiment, the second receiver 1401 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned ariel vehicle, test equipment like transceiving device simulating partial functions of base station or signaling tester, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A user equipment (UE) comprising:
a transceiver; and a processor operatively coupled to the transceiver, the processor configured to:

control the transceiver to receive a control signal, from a base station, on a first wireless link for cellular communications, wherein:

the control signal comprises information indicating a first identifier that identifies a first reference signal resource and a second identifier set comprising a plurality of second identifiers, the first reference signal resource is associated with a demodulation reference signal (DMRS) for a first channel on the first wireless link and defines a spatial filter for reception or transmission of the DMRS of a first data signal, and each second identifier is associated with a corresponding second reference signal resource, control the transceiver to transmit the first data signal on the first channel of the first wireless link, and control the transceiver to transmit, on a second wireless link for communications other than cellular communications, a second data signal on a second channel using one of the second reference signal resources associated with a selected second identifier from the second identifier set such that a DMRS of the second channel is Quasi Co-located (QCL) with the corresponding second reference signal resource, the second wireless link being between the UE and a node that is not the base station.

2. The UE according to claim 1, wherein the controller is further configured to transmit, on the second wireless link, a control signal that comprises information indicating:

a second time-frequency resource set occupied by the second data signal, and the selected second identifier is one of Q1 second-type identifiers of the second identifier set, Q1 being a positive integer greater than 1.

3. The UE according to claim 1, wherein the processor is further configured to receive a target information set that indicates that the first identifier is associated with the second identifier set.

4. The UE according to claim 1, wherein the processor is further configured to receive a first information set that indicates a first identifier set comprising K1 first-type identifiers, K1 being a positive integer greater than 1; the first identifier is a first-type identifier among the K1 first-type identifiers, the first identifier being one of the K1 first-type identifiers indicated by the first information set.

5. The UE according to claim 1, wherein none of a plurality of Q1 second-type reference signal resources respectively associated with the plurality of second identifiers is spatially related to first reference signal resource.

6. The UE according to claim 1, wherein the first reference signal resource comprises at least one of a synchronization signal/physical broadcast channel block (SSB) or a sounding reference signal (SRS) resource.

7. The UE according to claim 1, wherein each second reference signal resource comprises a channel state information reference signal (CSI-RS) resource for sidelink or a synchronization signal for sidelink.

8. The UE according to claim 1 wherein time-domain resources occupied by the first data signal and the second data signal overlap and at least occupy one same orthogonal frequency division multiplexing (OFDM) symbol in the time domain.

9. The UE according to claim 1, wherein frequency-domain resources occupied by the first data signal and the second data signal are orthogonal in the frequency domain.

10. The UE according to claim 4, wherein the first identifier set comprises K1 to Q1, the first-type identifiers and the second identifier set comprises Q1 second-type identifiers, and K1 is equal to Q1, the selected second identifier having a position in the second identifier set that corresponds to a position of the first identifier in the first identifier set.

11. The UE according to wherein the information indicated by the control signal is such that the first identifier activates the second identifier set for the second wireless link.

12. The UE according to claim 11, wherein time domain resources occupied by the control signal define a first instant of time-domain resources occupied by the second data signal are later than the first instance of time.

13. The UE according to claim 11, wherein activation of the second identifier set is effective only within a time window occupying multiple slots consecutive in the time domain.

14. The UE according to claim 13, wherein a start of the time window is the first instance of time defined by the time-domain resources occupied by the control signal.

15. The UE according to claim 1, wherein the first identifier comprises at least one of a transmission configuration indication (TCI) or a sounding reference signal indicator (SRI).

16. The UE of claim 1, wherein the second identifier comprises at least one of a TCI for sidelink or an SRI for sidelink.

17. The UE according to claim 1, wherein a pathloss for the wireless link determines a transmit power value of the first data signal and a transmit power value of the second data signal is unrelated to the pathloss for the first wireless link.

18. The UE according to claim 1, wherein the second identifier set comprises Q1 second-type identifiers and Q1 second-type beamforming vectors, Q1 being a positive integer greater than 1, the second-type identifiers being respectively associated with the Q1 second-type beamforming vectors, and the first reference signal resource is not related with any one of the Q1 second-type beamforming vectors.

19. A base station for wireless communications, comprising:

a transceiver; and a processor operatively coupled to the transceiver, the processor configured to:

control the transceiver to transmit, to a user equipment (UE), on a first wireless link for cellular communications, a control signal, wherein:

the control signal comprises information indicating a first identifier that identifies a first reference signal resource and a second identifier set comprising a plurality of second identifiers, the first reference signal resource is associated with a demodulation reference signal (DMRS) for a first channel on the first wireless link and defines a spatial filter for reception or transmission of the DMRS of a first data signal, and each second identifier is associated with a corresponding second reference signal resource; and control the transceiver to transmit the first data signal on the first channel of the first wireless link toward the UE, wherein the information indicated by the control signal is such that the UE is enabled to transmit, on a second wireless link for communications other than cellular communications, a second data signal on a second channel using one of the second reference signal resources associated with a selected second identifier from the second identifier set such that a DMRS of the second channel is quasi co-located (QCL) with the corresponding second reference signal resource, the second wireless link being between the UE and a node that is not the base station.

20. A method, implemented in a wireless transmit/receive unit (WTRU), the method comprising:

receiving a control signal, from a base station, on a first wireless link for cellular communications, wherein:

the control signal comprises information indicating a first identifier that identifies a first reference signal resource and a second identifier set comprising a plurality of second identifiers, the first reference signal resource is associated with a demodulation reference signal (DMRS) for a first channel on the first wireless link and defines a spatial filter for reception or transmission of the DMRS of a first data signal, and each second identifier is associated with a corresponding second reference signal resource, controlling the transceiver to transmit the first data signal on the first channel of the first wireless link; and controlling the transceiver to transmit, on a second wireless link for communications other than cellular communications, a second data signal on a second channel using one of the second reference signal resources associated with a selected second identifier from the second identifier set such that a DMRS of the second channel is Quasi Co-located (QCL) with the corresponding second reference signal resource, the second wireless link being between the UE and a node that is not the base station.

* * * * *